(12) United States Patent
Wall et al.

(10) Patent No.: US 11,581,954 B1
(45) Date of Patent: Feb. 14, 2023

(54) ARRAY OF VLF SCATTERERS FOR CONTROL OF ELECTROMAGNETIC WAVE PROPAGATION ON THE OCEAN SURFACE

(71) Applicant: HRL Laboratories, LLC, Malibu, CA (US)

(72) Inventors: Walter S. Wall, Calabasas, CA (US); Carson R. White, Agoura Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 121 days.

(21) Appl. No.: 16/870,784

(22) Filed: May 8, 2020

Related U.S. Application Data

(60) Provisional application No. 62/872,045, filed on Jul. 9, 2019.

(51) Int. Cl.
*H04B 13/02* (2006.01)
*H01Q 15/02* (2006.01)
*H01Q 7/00* (2006.01)
*H01Q 9/30* (2006.01)

(52) U.S. Cl.
CPC ............ *H04B 13/02* (2013.01); *H01Q 15/02* (2013.01); *H01Q 7/00* (2013.01); *H01Q 9/30* (2013.01)

(58) Field of Classification Search
CPC .................................................... H04B 13/02
See application file for complete search history.

(56) References Cited

U.S. PATENT DOCUMENTS

| | | | |
|---|---|---|---|
| 3,705,407 A | * | 12/1972 | Wickersham .......... H01Q 11/02 343/846 |
| 4,335,469 A | | 6/1982 | Tharp |
| 4,476,576 A | | 10/1984 | Wheeler |
| 4,903,036 A | | 2/1990 | Wheeler |

(Continued)

FOREIGN PATENT DOCUMENTS

| | | |
|---|---|---|
| CN | 106506015 A | 3/2017 |
| GB | 2457581 A | 8/2009 |

(Continued)

OTHER PUBLICATIONS

U.S. Appl. No. 16/868,443, White, filed May 6, 2020.

(Continued)

*Primary Examiner* — Hsinchun Liao
(74) *Attorney, Agent, or Firm* — Ladas & Parry, LLP

(57) ABSTRACT

An array of preferably electrically small scatterers is spaced at more or less regular intervals from a central transmitter. Each scatterer element includes a tunable or static reactive load which allows the propagation and fields generated by the central transmitter to be precisely controlled. Each scatterer element in the array also includes a resistive element whose value may change as a function of a distance between each scatterer and the central transmitter and which typically increases as a function of that distance. The central transmitter in the array nominally comprises an antenna, matching network, RF driver, and a vehicle, which may be a maritime vehicle or platform. The antenna for this transmitter may be comprised of an electrically small monopole oriented normal to the surface of the ocean or an electrically small loop antenna oriented with its magnetic moment parallel to the surface of the ocean.

32 Claims, 7 Drawing Sheets

(56) References Cited

U.S. PATENT DOCUMENTS

| | | | |
|---|---|---|---|
| 6,058,071 | A | 5/2000 | Woodall |
| 8,760,355 | B1 | 6/2014 | Tonn |
| 2005/0206573 | A1* | 9/2005 | Iigusa .................... H01Q 13/10 |
| | | | 343/770 |
| 2007/0285316 | A1* | 12/2007 | Saily .................... H01Q 15/008 |
| | | | 343/909 |
| 2008/0143621 | A1* | 6/2008 | Diaz ........................ H01Q 7/00 |
| | | | 343/742 |
| 2015/0092824 | A1* | 4/2015 | Wicker, Jr ........... H04B 17/336 |
| | | | 375/224 |
| 2017/0194703 | A1* | 7/2017 | Watson .................. H01Q 1/523 |

FOREIGN PATENT DOCUMENTS

| | | |
|---|---|---|
| RU | 2666904 C1 | 9/2018 |
| RU | 2019116043 A | 11/2020 |

OTHER PUBLICATIONS

King, R., et al., "The synthesis of surface reactance using an artificial dielectric", IEEE Transactions on Antennas and Propagation, vol. 31, No. 3, May 1983, pp. 471-476.

Linvill, J.G., "Transistor Negative-Impedance Converters," in Proceedings of the IRE, vol. 41, No. 6, pp. 725-729, Jun. 1953.

Silveirinha, M., "Electromagnetic characterization of textured surfaces formed by metallic pins", IEEE Transactions on Antennas and Propagation, vol. 56, No. 2, Feb. 2008, pp. 405-415.

From U.S. Appl. No. 16/868,443 (non-publication requested), Notice of Allowance dated Aug. 5, 2022.

From U.S. Appl. No. 16/868,443 (non-publication requested), Office Action dated May 25, 2022.

From U.S. Appl. No. 16/868,443 (non-publication requested), Office Action dated Feb. 14, 2022.

* cited by examiner

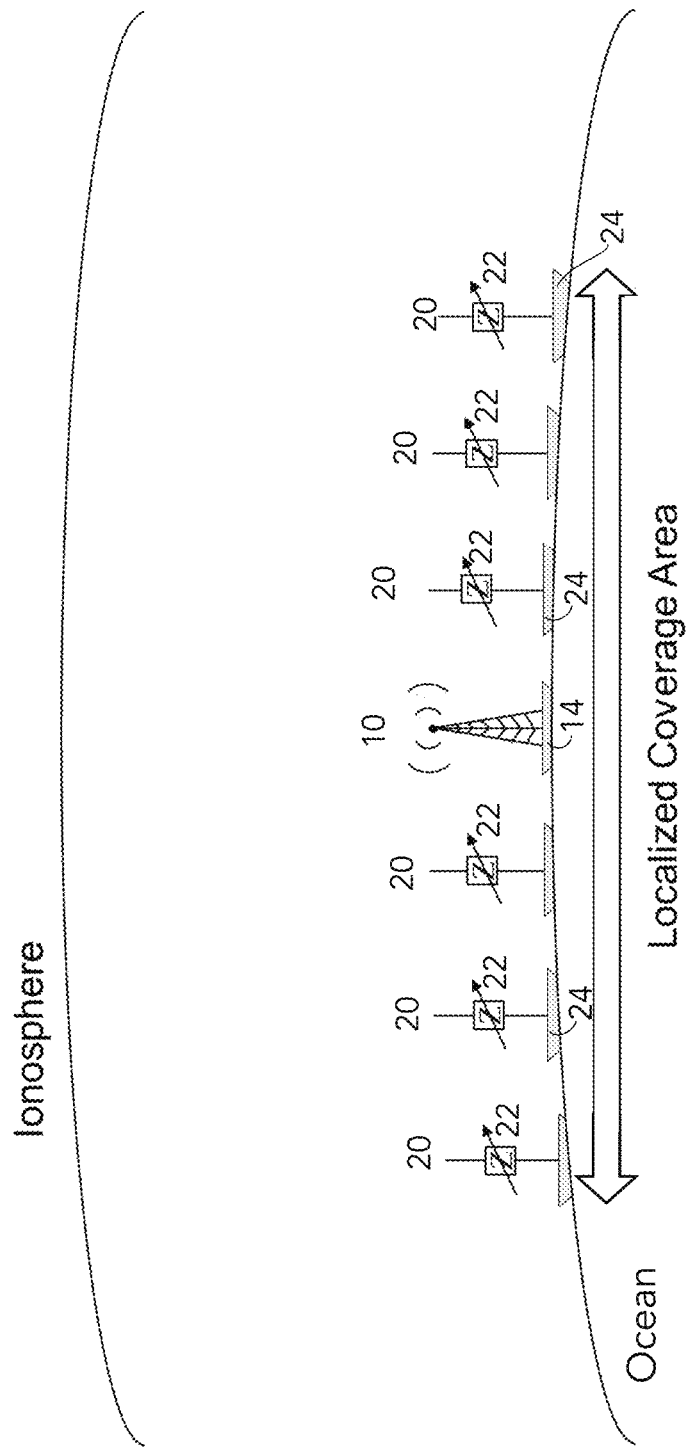

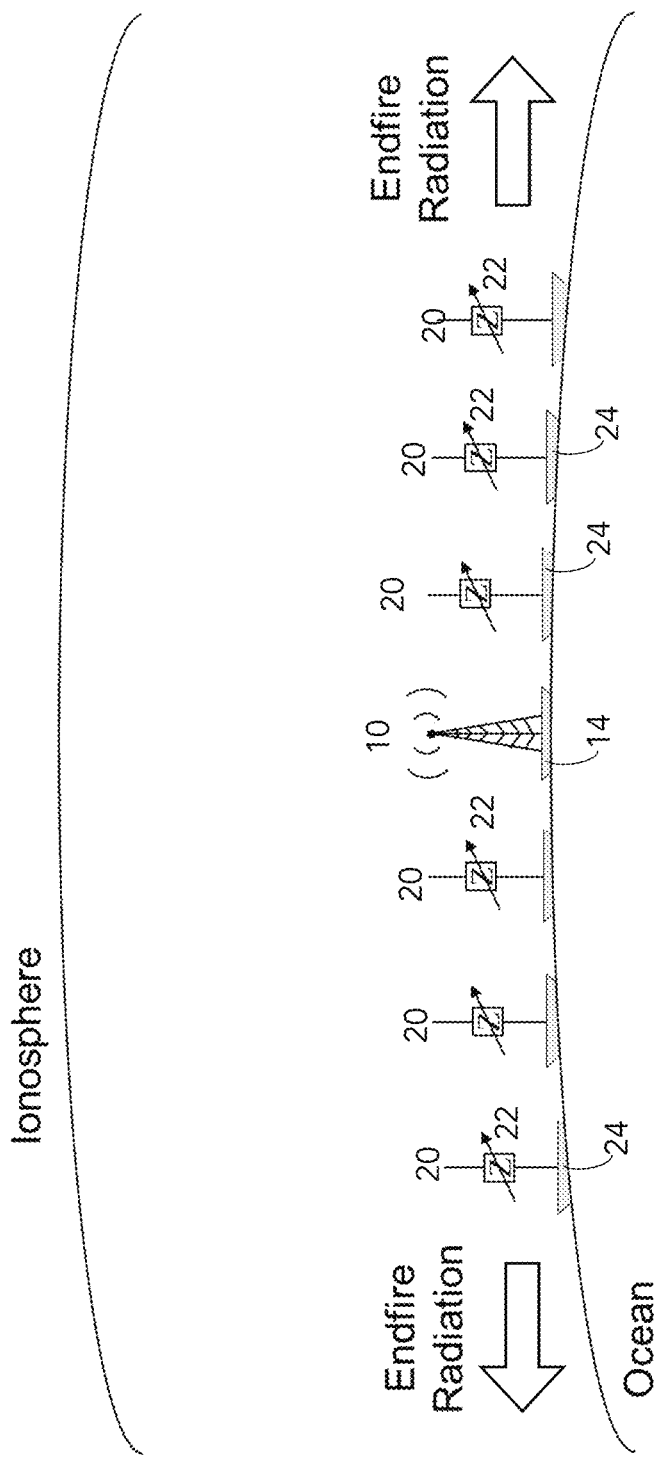

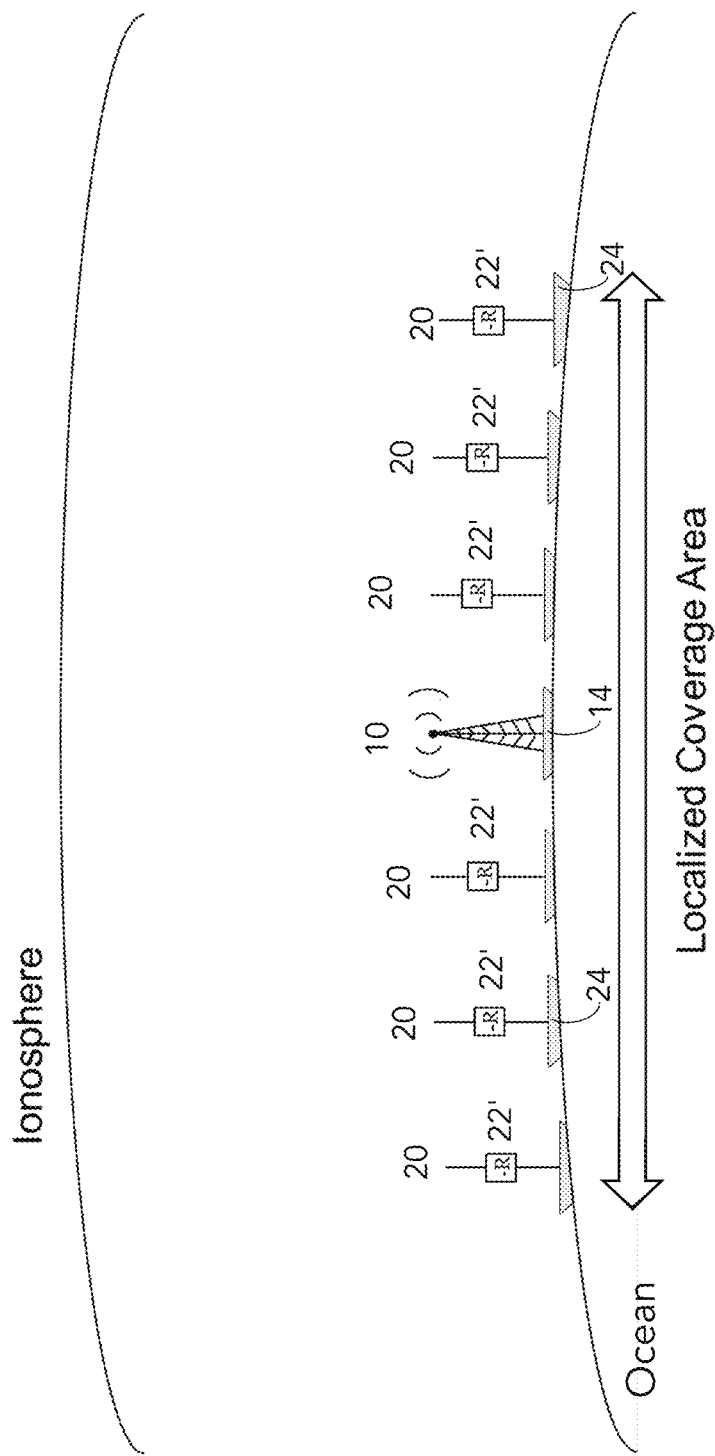

ARRAY OF VLF SCATTERERS FOR CONTROL OF ELECTROMAGNETIC WAVE PROPAGATION ON THE OCEAN SURFACE

CROSS REFERENCE TO RELATED APPLICATIONS

This application claims the benefit of US Provisional Patent Application Ser. No. 62/872,045 filed 9 Jul. 2019 and entitled "An Array of VLF Scatterers for Control of Electromagnetic Wave Propagation on the Ocean Surface", the disclosure of which is hereby incorporated herein by reference.

This application is related to U.S. Provisional Patent Application Ser. No. 62/871,900 also filed 9 Jul. 2019 and entitled "Distributed Semi-Autonomous Phased Arrays for Subsurface VLF Transmission", the disclosure of which is also hereby incorporated herein by reference.

STATEMENT REGARDING FEDERALLY SPONSORED RESEARCH OR DEVELOPMENT

This invention was made under US Government Contact N66001-19-C-4018 and therefor the US Government may have certain rights in this invention.

TECHNICAL FIELD

Unlike, traditional VLF transmitters, which use a small number of very large transmitters, this invention describes a transmitter architecture which utilizes large numbers of distributed and electrically small scatterers on independent autonomous platforms coupled to one or a few electrically small transmitters. Unlike its predecessors, this approach enables improved control of VLF coverage as well as reduced transmitter power.

BACKGROUND

Conventional VLF transmitters used for command and control of submerged platforms are large monolithic structures, requiring massive size and operational costs to achieve their mission. These systems also typically rely on propagation off the ionosphere and consequently broadcast signals over extremely large areas, making transmit signals relatively easy to intercept. The disclosed invention seeks to utilize arrays of scattering elements coupled to electrically small transmitters to enable transmission of VLF signals, for example, under the surface of the ocean and over a large but contained area, without transmitters of massive size and power.

A variety of VLF transmitter architectures have been proposed and investigated. The most common type are large ground based stations such as the Cutler station in Maine. Typically these transmitters are constructed of one or a few very large top-loaded monopole structures designed to couple energy into the earth-ionosphere waveguide (EIW) and provide VLF coverage over large sections of the earth. Another transmitter architecture is deployed on the TACAMO system and utilizes a long wire antenna trailing behind an airplane to achieve VLF transmission from a single mobile platform. Yet another VLF transmitter architecture employs aerostats and consists of a ground based VLF source feeding a long conductor supported by a lighter than air object such as an aerostat or balloon. A final architecture is the NASA tethered satellite system (TSS) which was intended to string a long conductor between two satellites to enable VLF/ELF transmission from orbit. While effective at generating VLF radiation all of these prior systems have relied on massive physical size to achieve efficient operation. These systems also do not provide a method of controlling VLF signal coverage.

Other techniques have also been proposed in the literature for VLF generation such as HF heating of the ionosphere but are dependent on conditions in the ionosphere, require massive HF transmitters, and provide limited ability to manage VLF coverage.

BRIEF DESCRIPTION OF THE DISCLOSED TECHNOLOGY

In one embodiment, the technology disclosed herein comprises one or more electrically small VLF transmitters supported, in one embodiment, by maritime platforms and surrounded by an array of electrically small scatterers each loaded with tunable or static reactance elements and supported by independent autonomous maritime platforms. Each scatterer in the array preferably comprises an electrically small antenna, in a preferred embodiment this antenna is a small monopole although any variety of electrically small antennas could be used, such as electrically small loop antennas. The reactive tuning elements may comprise tunable capacitors and inductors and their values are chosen, in this embodiment, to minimize radiation from the array without creating loss. One very desirable effect of this invention is that the area over which VLF signals can be received from a single VLF transmitter, can be extended without increasing transmitter power and while minimizing the strength of signals outside the coverage area. In a variation on this embodiment, the reactance values in the network are chosen to increase the strength of radiated signals in the direction parallel to the ocean surface while minimizing radiation at angles closer to the surface normal. This variation allows the coverage area of the array to be increased without having to increase either the number of elements or input power to the array and while still minimizing the reception outside the coverage area by reducing sky wave propagation. In another variation on this embodiment, each scatterer in the array is loaded with negative resistance elements instead of or in addition to a tunable reactance value.

BRIEF DESCRIPTION OF THE DRAWINGS

FIG. 5 is an illustration of one embodiment of the disclosed technology in which a central transmitter is surrounded by a large array of electrically small scatterers each loaded with a reactance element such that radiation from the array is suppressed but field generation within the array is allowed.

FIG. 6 is an illustration of another embodiment of the disclosed technology in which a central transmitter is surrounded by a large array of electrically small scatterers each loaded with a reactance element such that radiation from the array in the direction normal to the surface of the ocean is suppressed but radiation in the direction parallel to the ocean surface and field generation underneath the array is allowed.

FIG. 7 is an illustration of another embodiment of the disclosed technology in which a central transmitter is surrounded by a large array of electrically small scatterers each loaded with a negative resistance element such that radiation from the array is suppressed but field generation within the array is allowed.

DETAILED DESCRIPTION

The following description is presented to enable one of ordinary skill in the art to make and use the presently disclosed technology and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph (f). In particular, the use of "step of" or "act of" in the claims herein is not intended to invoke the provisions of 35 U.S.C. 112, Paragraph (f).

Conventional VLF transmitters are large monolithic structures designed to provide coverage over large areas by coupling energy into the earth's ionosphere waveguide. Because of propagation in the earth ionosphere waveguide, it is difficult to restrict the area over which signals generated from the transmitter can be received.

Figure 1:
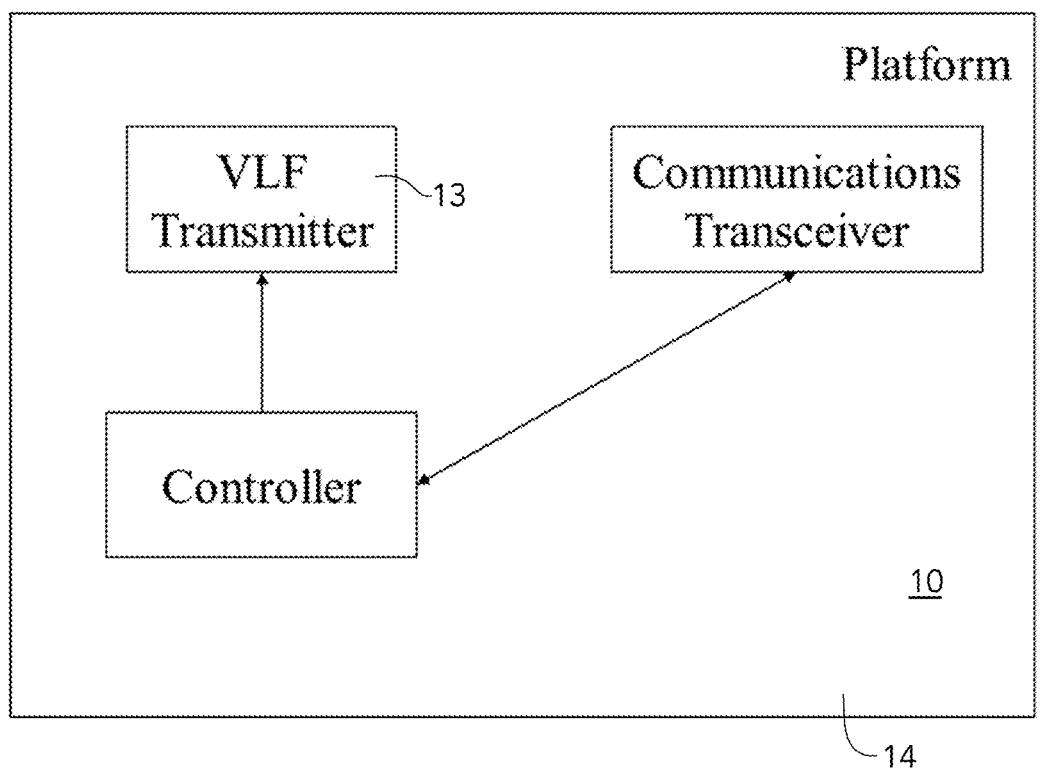
FIG. 1 is a diagram showing major subsystems within the central transmitter and their connections to one another.
Figure 2:
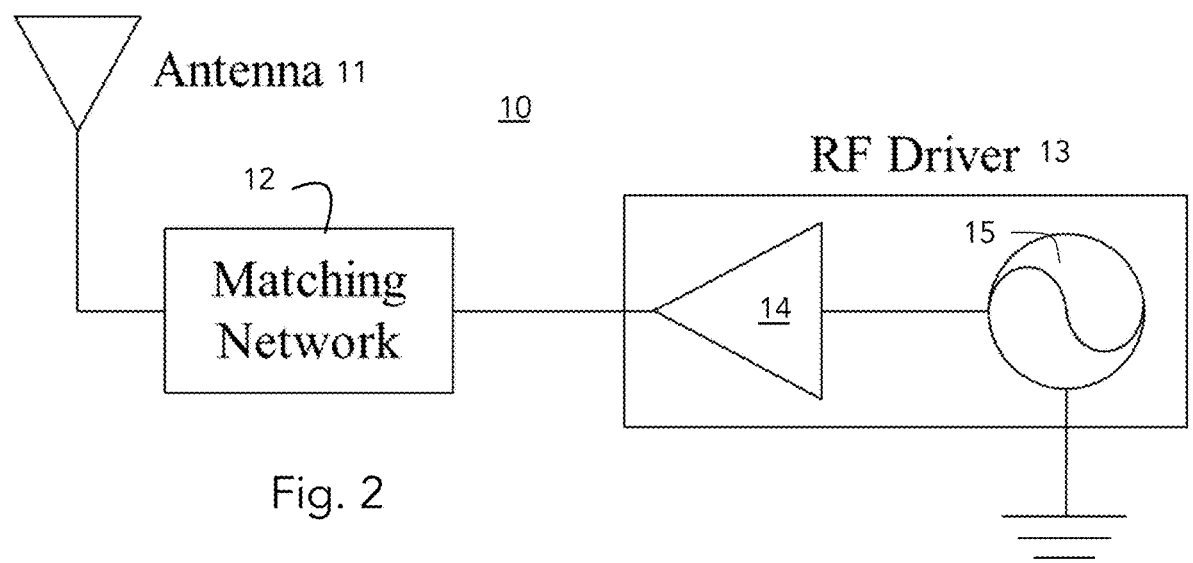
FIG. 2 is a high level or overview schematic of VLF transmitter showing major components (i.e. antenna, matching network, and RF driver) as well as their connection to one another of a transmitter disposed centrally to an array of scatterers.
Figure 3:
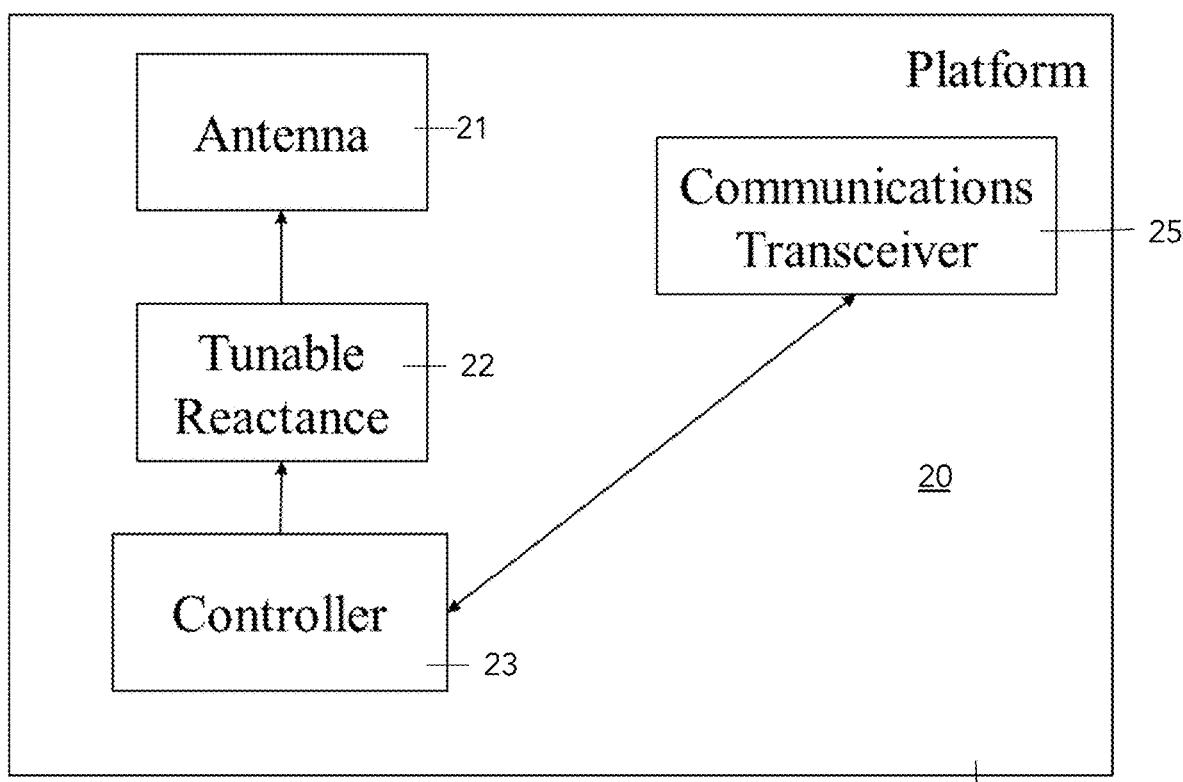
FIG. 3 is a diagram showing major subsystems within each electrically small scatterer and their connections to one another.
Figure 4:
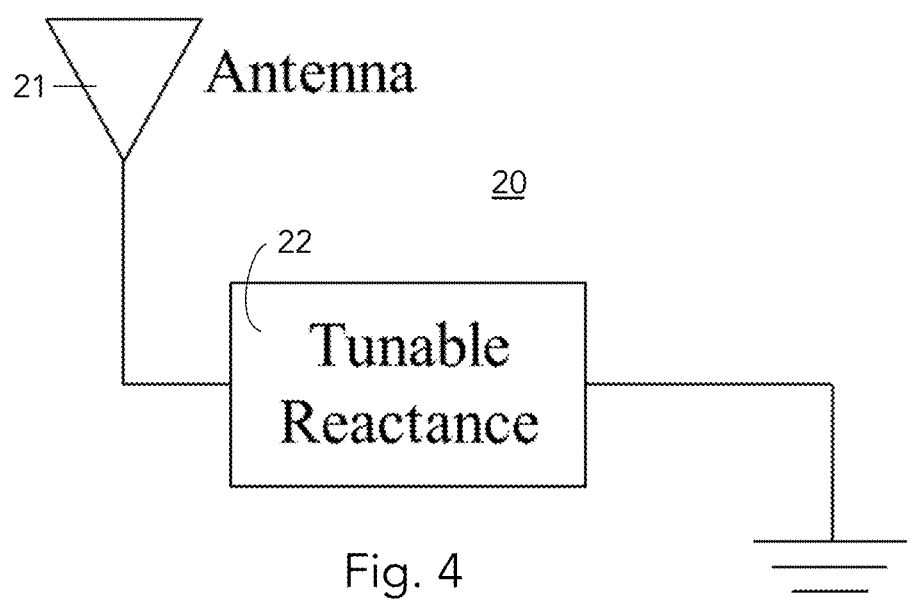
FIG. 4 is a high level or overview schematic of electrically small scatterer showing major components (i.e. antenna and tunable reactance) as well as their connection to one another.

The technology described herein includes an array of electrically small scatterers 20 spaced at regular intervals from a centralized transmitter 10. Each element 20 in the array contains a tunable or static reactive load 22 which allows the propagation and fields generated by the central transmitter 10 to be precisely controlled. The central transmitter 10 in the array would nominally be comprised of an antenna 11, matching network 12, RF driver 13, and a vehicle 14, which may be a maritime vehicle or platform (see FIGS. 2-7). The antenna 11 for this transmitter 10 may be comprised of an electrically small monopole oriented normal to the surface of the ocean or an electrically small loop antenna oriented with its magnetic moment parallel to the surface of the ocean. The antenna 11 does not have to be electrically small. If a theatre provides sufficient support for a full size VLF antenna, for example, such as aerial or space environment, then it is reasonable to deploy a full size VLF antenna 11. But this technology may be advantageously used with electrically small VLF antennas 11 that are substantially smaller than a characteristic wavelength at VLF.

The matching network 12 for this transmitter 10 may be comprised of inductors, capacitors, switches, and/or any combination of the aforementioned appropriate to cancel the reactance of the antenna and improve transmitter efficiency over the desired bandwidth. The RF driver 13 for the transmitter may be comprised of an RF signal generator 14 electrically connected to an amplifier 15. The vehicle 14 for the transmitter may be comprised of any number of platforms such as but limited to autonomous boats, ships, planes, or land based vehicles.

The electrically small scatterers 20 (sometimes referred to as scattering elements herein) surrounding the central transmitter 10 may be comprised of an antenna 21, a tunable or static reactive load 22, and a vehicle 24. In some embodiments the scatterer may have a negative resistance, thereby implying a gain element (an amplifier, for example). Both the antenna 21 and vehicle 24 may be comprised of the same options previously listed for the centralized transmitter 10. The reactive load 22 may be comprised of a static inductor or capacitor, a tunable inductor or capacitor, switching elements, and/or any combination of the aforementioned elements required to create the desired field and wave propagation effects. The value of reactance in each of the scatterers 20 is chosen based on a variety of methods specific to the desired implementation and provided in the detailed description of each embodiment below. Coordination of the centralized transmitter and the scattering elements is achieved through a variety of techniques. In one variation, each element 20 in the array is fully autonomous and controls its position and operation using on-board autonomous algorithms in one embodiment of a controller 23. In another variation, one element 20 in the group (or the transmitter 10) is designated as the master element and determines the position and operation of the group through on-board autonomous algorithms or through instructions received via a long-haul communication channel using a communication receiver 25. In this variation, communication between the master element and the other elements in the group may be achieved using a local communication network using communication receiver 25. In a final variation, each element in the group is coordinated individually through a long-haul communication channel connected to a remote operator.

As such, there are basically different teaming/swarming strategies:

I. Long haul communication network can be used to communicate the following: Data to be transmitted as VLF signals; Desired position and state of array from central command; and Current measured state of array to central command.

II. Local communication network can be used to communicate the following: Desired position and state of array from master unit and Current measured state of array element to master unit or other units.

In the prior art, it has been shown that closely spaced "bed of nails" structures, comprising periodic arrays conducting pins protruding vertically from a conducting plane, guide a bound TM surface wave. See, for example, King, R., D. Thiel, and K. Park, "The synthesis of surface reactance using an artificial dielectric", IEEE Transactions on Antennas and Propagation 31.3 (1983): 471-476 and Silveirinha, Mario G., Carlos A. Fernandes, and Jorge R. Costa, "Electromagnetic characterization of textured surfaces formed by metallic pins", IEEE Transactions on Antennas and Propagation 56.2 (2008): 405-415. The disclosures of these two documents are hereby incorporated herein by this reference. For a close spacing (much smaller than the wavelength and also smaller than the height), it was found that for short pins, the propagation constant is close to that of free-space the wave is loosely bound. Conversely, as the height approaches quarter wave (for a monopole embodiment, for example), the wave becomes tightly bound and the propagation becomes much slower than free-space. The taller (for a monopole embodiment) or bigger (for a loop embodiment) the scatterers are the smaller the reactance values loading them need to be. As the scatterers get smaller larger reactive loadings are required and in order to maintain effectiveness the quality factor of these reactive loadings also needs to go up. A very small scatterer might require an impractically large and low loss reactive value and therefore make an embodiment not particularly feasible, so, from an engineering perspective, the size of the scatterer needs to be weighed against amount of reactive loading required by it and also needed to control it.

In one embodiment (see FIG. 5), the central transmitter 10 is surrounded by an array of more or less uniformly spaced scatterers 20 each loaded with a reactance element or elements 22. The array of scatters 20, if viewed from a top down perspective, would appear much like a two dimensional array except that the array is disposed on a curved surface (the surface of the planet Earth), so the array looks much like a two dimensional array, but actually occurs in three dimensions due to the curvature of the Earth. Each scatterer 20 is preferably spaced a uniform distance of less than one half wavelength (of the signal to be transmitted) and preferably less than one sixth of a wavelength from its nearest neighbor, with the central transmitter located at the center of the array and also spaced less than one half wavelength and preferably less than one sixth of a wavelength from the immediately adjacent elements (such as the scatterers 20). If the frequency of the signal to be transmitted is sufficiently high, then the curvature of the Earth is deminimus and placing the scatterers 20 with uniform spacings is theoretically easy (although the movement of platforms of the surface to the ocean will make more difficult in practice). So while uniform spacings between scatterers 20 might be ideal from a mathematical standpoint, in reality those spacings will very likely be less than ideal.

In this embodiment the value of the reactance elements 22 loading each scatterer 20 is preferably chosen to suppress radiation from the array while supporting generation of an exponentially decaying field underneath the array. This is accomplished by designing the TM surface wave (of the scatterers) to have a propagation constant substantially higher than the Norton surface wave, such that the phase difference between the bound TM surface wave and the Norton surface wave propagating from the center to the perimeter is >>180 degrees. The outer elements of the array may be made to be absorbing in order to mitigate potential reflections from the impedance discontinuity that occurs at the perimeter of the impedance surface formed by the array. See King et al. discussed below.

King et al (King, D. Thiel, and K. Park. "The synthesis of surface reactance using an artificial dielectric," IEEE Transactions on Antennas and propagation 31.3 (1983), pp. 471-476) provide formulas for computing the propagation constant of a TM surface wave in the situation of an infinite array of electrically small monopoles over a ground plane. For large arrays one can use this propagation constant as an approximation to the actual propagation constant of the array disclosed herein and design the height and number elements in the array to generate a propagation constant which is much larger than the propagation constant of the Norton wave. The reactance values at each antenna may be determined using the following procedure:

Step 1. Calculate desired physical height of scattering elements of the antenna according to King et al. The scattering elements if monopoles, for example, will, according to King et al., have a height less than a quarter wave, and thus need reactance to present a desired surface impedance as noted at step 3.

Step 2. Calculate antenna reactance given solely the physical height of the antenna determined in step 1.

Step 3. Apply sufficient reactive loading by element 22 at or near the input of the antenna (preferably at the base of a monopole antenna, for example) such that the total reactance of the antenna calculated at step 2 and applied load impedance has a desired reactance which creates a TM surface wave cancelling the Norton wave. The load impedance will also have a real part with resistance in addition to a imaginary part with typically inductance.

It would be desirable to progressively increase the loss associated with each element or the real part of the load impedance for elements spaced farther away from the center element (central transmitter 10). This resistive loading will serve to suppress the TM wave as it propagates to the edge of the array thereby mitigating any reflections due to discontinuities in the surface impedance at the edge of the array.

In regards to how the impedance of reactance elements 22 may be determined "on the fly" (if made tunable), the real part of the impedance would be solely determined by the total number of elements, in the array and what level of reflected wave is acceptable for the system. There are a variety of resistive tapers that could be used including linear and exponential. It is envisioned that a taper design would be determined apriori and relayed to each element in the array via the aforementioned inter-element communication network. Reactance values in the network would be determined based on the emitted frequency of the central transmitter and the desired reactance of each element previously described. Therefore, reactance tuning of each element would be achieved by first having each element in the array sense the emitted frequency of the central transmitter and then adjust their reactive elements accordingly.

In a second embodiment (see FIG. 6), the central transmitter 10 is surrounded by an array of more or less uniformly spaced RF scatterers 20 each loaded with a reactance element or elements 22 as in the first embodiment. The spacing between nearest neighbor scatters 20 and to the central transmitter 10 is preferably the same as in the first embodiment of FIG. 5. In this embodiment the value of the reactance elements 22 loading each scatterer 20 is chosen to suppress radiation from the array in the direction normal to the surface of ocean while encouraging radiation in the direction parallel to the ocean surface thereby providing directivity in the polar coordinates (as opposed to the azimuthal coordinates). This is accomplished by designing the TM surface wave to have a propagation constant close to that of the Norton surface wave, such that the phase difference between the bound TM wave and the Norton surface wave propagating from the center to the perimeter is approximately 180 degrees (as is common for Yagi-Uda arrays). The wave is radiated at the edge so there is no need to absorb it. As the number of RF scatterers in the array increases, directivity also improves. The three steps set forth for the embodiment of FIG. 5 can be followed, provided that the third step is first modified to comport with how the added reactance that creates the desired TM surface wave has a propagation constant close to that of the Norton surface wave, such that the phase difference between the bound TM wave and the Norton surface wave propagating from the center to the perimeter is approximately 180 degrees.

In the first two embodiments, the field strength decays as 1/sqrt(distance). This can modified by integrating amplification into the scatterers preferably using negative resistance. So in a third embodiment (see FIG. 7), the central transmitter 10 is surrounded by an array of more or less uniformly spaced scatterers 20 each loaded with a negative resistance or gain element 22'. Each scatterer 20 is spaced a more or less uniform distance less than one half wavelength from its nearest neighbor (preferably <one sixth wavelength), with the central transmitter 10 located at the center of the array and also spaced less than one half wavelength from the immediately adjacent elements 20. In this embodiment the magnitude of the negative resistance elements 22' loading each scatterer 20 is chosen to amplify the field generated by neighboring elements such that field generated underneath the array is sufficient to meet a desired field strength metric while having a relatively constant field strength over the area of the impedance surface. The value of the negative resistance is chosen to provide a gain proportional to the square root of the distance to compensate for the space loss of the cylindrical wave. The value may be chosen to be substantially low to avoid excessive gain, which could lead to oscillation. The negative resistance can be provided by means of a negative impedance converter, negative resistance diode, or any other device capable of producing negative resistance.

The array of scatterers 20 in the foregoing embodiments may be formed as a circular or radial array or as a two dimensional linear array or as an array which is more or less a combination of the foregoing. While the spacings of the scatterers 20 from each other is preferably uniform (and typically considered to be uniform from a mathematical analysis viewpoint of the impedance surface formed by the scatterers 20), those spacings will likely not be truly uniform in real-life embodiments. It is believed that a if the spacings varied by plus or minus 10% (or even more) that can most likely be tolerated in terms of the mathematical analysis assuming a uniform array.

Moreover, the overall size of the array is likely to be much, much less than the radius of the earth, so the earth's surface (the ocean surface in many embodiments) may be considered to be a planar surface for analysis purposes.

A scatterer 20 as that term is used herein refers to any body with sufficient conductivity to allow for induction of currents from an external field. A monopole antenna 21 is one example of a scatterer 20 and a loop antenna 21 is another example of a scatterer 20, but an infinite variety of conductive shapes would also be acceptable, bearing in mind the engineering tradeoff between the physical size of the conductive shape and the reactive loading which it will likely need if under a quarter wavelength in size. If a loop is used, the plane of the loop is preferably oriented to be parallel to the earth's surface (the ocean surface in many embodiments) so that it is preferably essentially omnidirectional.

Some embodiments have a negative resistance and hence they exhibit gain by utilizing a gain element or amplifier. The negative resistance element may be comprised of components well known in the art such as tunnel diodes or negative impedance converters (see J. G. Linvill, "Transistor Negative-Impedance Converters," in *Proceedings of the IRE*, vol. 41, no. 6, pp. 725-729, June 1953). Assuming that this scattering technology is used at VLF, any effective delay caused by such a gain element should be infinitesimal at those frequencies so that any delay associated with the gain element may be ignored. In those embodiments transmission and reception are effectively happening simultaneously.

The scatterers 20 are electrically small antennas, such as monopoles or loop antenna, which are capacitive at the nominal frequency of the central transmitter 10. The loading elements 22 may be static or tunable by the disclosed system and include a both real part (a positive resistance in many embodiments or perhaps a negative resistance or gain element in other embodiments) and an imaginary part (typically an inductance). The typical antenna systems, the imaginary part of the reactance is to offset or cancel the capacitance of an electrically small antenna. That is not the case here. Rather here the reactance of the electrically small antenna of the scatterer 20 is combined with the reactance (including its resistance) added by element 22 to shape (enhance or reduce or cancel) the Norton field generated by the central transmitter 10 as is described above.

The central transmitter 10 is preferably disposed at or near a geometric center of the array of scatterers 20. A less desirable option would be to locate the central transmitter 10 closer to a perimeter of the array than to a center or central region of it since the propagation from the central transmitter 10 is then typically less contained. But if the propagation is via water (the ocean for example), the array could be disposed near a shore line and the central transmitter may then be land-based while many or all of the scatterers 20 are disposed on watercraft.

The central transmitter 10 may be comprised of a single or multiple transmitting elements.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ."

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. An array of RF scatterers for control of electromagnetic wave propagation, on a planetary surface, such as an ocean surface, each scatterer in the array is electrically small and the scatterers are spaced at intervals from a transmitter disposed adjacent or within said array, the scatterers each having an reactance due to the scatterer being electrically small at a nominal frequency of the transmitter and a complex impedance element having an impedance with a real part and an imaginary part, the imaginary part (or reactance) of which is determined to suppress or augment or otherwise control a surface wave generated, in use, by the transmitter, said surface wave being bound to said planetary surface.

2. The array of claim 1 wherein the real part of the complex impedance element changes as a function of a distance each scatterer is spaced from the transmitter.

3. The array of claim 1 wherein each element in the array contains a tunable or static reactive load which allows the propagation and fields generated by the transmitter to be controlled.

4. The array of claim 1 wherein the transmitter in the array comprises an antenna, matching network, RF driver, and a vehicle or platform disposed said planetary surface.

5. The array of claim 4 wherein the antenna for the transmitter is comprised of an electrically small monopole oriented normal to said planetary surface or an electrically small loop antenna oriented with its magnetic moment parallel to said planetary surface.

6. The array of claim 5 wherein the matching network for the transmitter is comprised of inductors, capacitors, switches, and/or any combination of the aforementioned appropriate to cancel the reactance of the antenna and improve transmitter efficiency over a desired bandwidth.

7. The array of claim 6 wherein the RF driver for the transmitter is comprised of an RF signal generator electrically connected to an amplifier.

8. The array of claim 7 wherein the vehicle or platform for the transmitter includes number autonomous boats, ships, planes, or land based vehicles.

9. An array of RF elements wherein the array of RF elements comprise a plurality of electrically small scatterers surrounding a central transmitter, wherein each scatterer comprises an antenna and a tunable or static complex impedance load, the complex impedance load including both a reactance (or imaginary part of the complex impedance) and a resistance (or real part of the complex impedance), a magnitude of the resistance part of the complex impedance load either staying constant or increasing as the scatterers are further spaced from the central transmitter.

10. The array of claim 9 wherein a majority of said RF elements are disposed on water-born vehicles.

11. The array of claim 9 wherein the resistance part of the complex impedance load has a negative value.

12. The array of claim 9 wherein the complex impedance comprises a static inductor or capacitor, a tunable inductor or capacitor, switching elements, a resistive element, and/or any combination of the aforementioned elements required to create a desired TM field to suppress or augment or otherwise control a bound surface wave generated, in use, by the transmitter and its attendant wave propagation effects.

13. The array of claim 9 wherein each RF element in the array is autonomous and controls its position and operation using on-board algorithms.

14. The array of claim 9 wherein the central transmitter and the scatterers are coordinated wherein one RF element in the array is designated as a master element which determines the position and operation of other RF elements in the array through on-board autonomous algorithms or through instructions received via a long-haul communication channel from a remote site.

15. The array of claim 14 wherein communication between the master element and the other elements in the array is achieved using a local communication network.

16. The array of claim 9 wherein the central transmitter and the scattering elements are coordinated wherein, each element in the array is coordinated individually through a long-haul communication channel connected to a remote site.

17. A method of controlling and/or enhancing RF transmissions having a predetermined wavelength from a transmitting antenna, the apparatus method comprising:
disposing an array of RF scattering elements in a vicinity of said transmitting antenna, the RF scattering elements in said array being spaced from each other and from said transmitting antenna by predetermined, and preferably uniform, distances, each RF scattering element comprising an RF antenna responsive to said RF transmissions and a complex impedance matching network, the complex impedance of the matching network having a real (or resistance) part and an imaginary (or reactance) part,
tuning the reactance of the impedance matching network of each of the RF scattering elements in the array to establish a desired surface impedance of the array of RF scattering elements.

18. The method of claim 17 wherein the reactance of the impedance matching network of each of the RF scattering elements in the array is adjusted to a value to suppress radiation away from the array while supporting generation of an exponentially decaying field underneath the array.

19. The method of claim 18 wherein outer most ones of the RF scattering elements in the array are made to be absorbing in order to mitigate potential reflections from an impedance discontinuity that occurs at a perimeter of the impedance surface formed by the array.

20. The method of claim 17 wherein a TM surface wave formed by the transmitting antenna and the RF scattering elements has a propagation constant substantially higher than the Norton (surface) wave, such that the phase difference between the TM surface wave and the Norton (surface) wave propagating from a center to a perimeter of the array is >>180 degrees.

21. The method of claim 17 wherein the array of RF scattering elements is disposed in the vicinity of the transmitting antenna and at or adjacent a surface of an ocean body of water, the reactance of the reactive matching network of each of the RF scattering elements in the array being adjusted to a value such that the elements loading each scatterer is chosen to suppress radiation from the array in the direction normal to the surface of ocean body of water while encouraging radiation in the direction parallel to the surface of the ocean body of water.

22. The method of claim 21 wherein a TM surface wave formed by the transmitting antenna and the RF scattering elements has a propagation constant close to that of a Norton surface wave, such that the phase difference between the TM wave and the Norton surface wave propagating from the center to the perimeter is approximately 180 degrees.

23. The method of claim 17 wherein at least selected ones of the reactive matching networks of the RF scattering elements in the array include a negative resistance element to enhance said RF transmissions.

24. The method of claim 17 wherein the RF scattering elements in said array are each disposed on an autonomous vehicle or platform.

25. An apparatus for controlling and/or enhancing RF transmissions having a predetermined wavelength from a transmitting antenna, the apparatus comprising:

an array of RF scattering elements disposed in a vicinity of said transmitting antenna, the RF scattering elements in said array being spaced from each other and from said transmitting antenna by predetermined, and preferably uniform, distances, each RF scattering element comprising an RF antenna responsive to said RF transmissions and a complex impedance matching network, the complex impedance of the matching network having a real (or resistance) part and an imaginary (or reactance) part, tuning the reactance of the impedance matching network of each of the RF scattering elements in the array to establish a desired surface impedance of the array of RF scattering elements.

26. The apparatus of claim 25 wherein the reactance of the impedance matching network of each of the RF scattering elements in the array is adjusted to a value to suppress radiation away from the array while supporting generation of an exponentially decaying field underneath the array.

27. The apparatus of claim 26 wherein outer most ones of the RF scattering elements in the array are energy absorbing in order to mitigate potential reflections from an impedance discontinuity that occurs at a perimeter of the impedance surface formed by the array.

28. The apparatus of claim 25 wherein a TM surface wave formed by the transmitting antenna and the RF scattering elements has a propagation constant substantially higher than the Norton (surface) wave, such that the phase difference between the TM surface wave and the Norton (surface) wave propagating from a center to a perimeter of the array is >>180 degrees.

29. The apparatus of claim 25 wherein the array of RF scattering elements is disposed in the vicinity of said transmitting antenna and at or adjacent a surface of an ocean body of water, the reactance of the reactive matching network of each of the RF scattering elements in the array is adjustable and wherein that reactance is adjusted to a value such that the elements loading each scatterer is chosen to suppress radiation from the array in the direction normal to the surface of said ocean body of water while encouraging radiation in a direction parallel to the surface of the ocean body of water.

30. The apparatus of claim 29 wherein a TM surface wave formed by the transmitting antenna and the RF scattering elements has a propagation constant close to that of a Norton surface wave, such that the phase difference between the TM wave and the Norton surface wave propagating from the center to the perimeter is approximately 180 degrees.

31. The apparatus of claim 25 wherein at least selected ones of the RF scattering elements in the array include a negative resistance element to enhance said RF transmissions.

32. The apparatus of claim 25 wherein the RF scattering elements in said array are each disposed on an autonomous vehicle or platform.

* * * * *